United States Patent [19]
Park

[11] Patent Number: 5,978,388
[45] Date of Patent: Nov. 2, 1999

[54] TONE GENERATOR

[75] Inventor: Jae-Min Park, Seoul, Rep. of Korea

[73] Assignee: SamSung Electronics Co., Ltd., Kyungki-do, Rep. of Korea

[21] Appl. No.: 08/777,141

[22] Filed: Dec. 30, 1996

[30] Foreign Application Priority Data

Dec. 30, 1995 [KR] Rep. of Korea ...................... 95-67864

[51] Int. Cl.⁶ ....................................................... H04J 3/12
[52] U.S. Cl. ........................................... 370/525; 375/242
[58] Field of Search ................................... 370/525, 526; 375/242; 327/107, 113, 129

[56] References Cited

U.S. PATENT DOCUMENTS

| | | |
|---|---|---|
| 3,798,637 | 3/1974 | Fruhauf . |
| 3,985,966 | 10/1976 | Edwards . |
| 3,999,049 | 12/1976 | Roche et al. . |
| 4,133,979 | 1/1979 | Helliwell et al. . |
| 4,205,203 | 5/1980 | Mehta et al. . |
| 4,227,248 | 10/1980 | Munter ..................... 370/525 |
| 4,399,535 | 8/1983 | Southard . |
| 4,570,260 | 2/1986 | Basehore . |
| 4,571,723 | 2/1986 | Lusignan et al. ....................... 370/525 |
| 4,599,700 | 7/1986 | Kerdoncuff et al. . |
| 4,727,333 | 2/1988 | Dieterich . |
| 5,050,188 | 9/1991 | Dirr . |
| 5,127,004 | 6/1992 | Lenihan et al. .......................... 370/525 |
| 5,659,663 | 8/1997 | Lin .......................................... 395/2.67 |
| 5,715,364 | 2/1998 | Tomiyori .................................. 375/242 |

*Primary Examiner*—Chau Nguyen
*Assistant Examiner*—Phuongchau Ba Nguyen
*Attorney, Agent, or Firm*—Robert E. Bushnell, Esq.

[57] ABSTRACT

A tone generator includes a controller for generating a frequency control signal, an address control signal, a tone period control signal and an automatic tone period mode, a sinusoidal wave generator having a nonvolatile table of a sampled value of $\pi/2$ period for synthesizing two single frequencies generated by dividing temporally the sampling frequency output from the nonvolatile table and outputting a dual sinusoidal wave, a gain signal generator for generating a gain signal, a multiplier for multiplying the sinusoidal wave and the gain signal to output tone sampling data, a pulse code modulator for pulse-code-modulating the tone sampling data to output a pulse code modulation code, a serial converter for converting the pulse code modulation code into a serial bit, a tone period control signal generator having a tone period memory and a timer, for outputting a tone period control signal of the controller when the automatic tone period mode of the controller is not activated, and outputting a tone period control signal of the timer according to a counter value output from the tone period memory by the address control signal when the automatic tone period mode is activated, and a switch for switching and outputting a signal output from the serial converter according to the tone period control signal.

3 Claims, 5 Drawing Sheets

Fig. 1 *(Prior Art)*

TONE GENERATOR

BACKGROUND OF THE INVENTION

1. Field of the Invention

The present invention relates to a tone generator, and more particularly, to a tone generator by which the size of a desired tone is memorized to then be varied by an address control. The present application is based upon Korean Application No. 67864/1995, which is incorporated herein by reference.

2. Description of the Related Art

FIG. 1 is a system block diagram of a conventional tone generator. Referring to FIG. 1, a tone read only memory (ROM) 122 converts a tone signal into a digital code by an analog-to-digital(A/D) converter and then stores the same according to a compressive conversion mode of A law or mu ($\mu$) law. The tone ROM 122 is installed in a tone generator of a system. An address generator 121 having received an address control signal of a controller (not shown) of the system controls the tone ROM 122 based on the address control signal. Then, the tone ROM 122 reads a tone signal of the corresponding address by the address generator 121 and generates a pulse code modulation (PCM) signal of a desired tone. Then, a serial converter 123 serially converts an input PCM and outputs the same. A tone period control signal generator 124 performed by an external software outputs a tone period control signal. An FET 125 outputs an output signal of the serial converter 123 applied to a drain to an output port of a source using the tone period control signal applied to a gate as a switching signal. Finally, the PCM value output through a switching operation is sent to a codec and is converted into an analog signal to then be heard by a user.

However, the tone ROM 122 should be differed depending on a tone size (frequency combination, tone gain, tone period control signal, number of tone sources, and A/$\mu$ law, etc.) Further, once the tone ROM 122 is installed, the change of the same is not possible. Also, the tone period control signal generator should be operated by an external software. In addition, the tone ROM 122 should be large.

SUMMARY OF THE INVENTION

Therefore, it is an object of the present invention to provide a tone generator which does not necessitate a tone ROM manufacturing procedure nor a software for controlling a tone period.

It is another object of the present invention to provide a tone generator for generating and providing a desired tone size by synthesizing a desired tone directly in a digital code manner and outputting the same.

To accomplish the above objects, there is provided a tone generator comprising: a controller for generating a frequency control signal, an address control signal, a tone period control signal and an automatic tone period mode; a sinusoidal wave generator having a nonvolatile table of a sampled value of $\pi/2$ period, which outputs corresponding sampling frequency according to the frequency control signal, for synthesizing two single frequencies generated by dividing temporally the sampling frequency output from the nonvolatile table and outputting a dual sinusoidal wave; a gain signal generator for generating a gain signal; a multiplier for multiplying the sinusoidal wave and the gain signal to output tone sampling data; a pulse code modulator for pulse-code-modulating the tone sampling data to output a pulse code modulation code; a serial converter for converting the pulse code modulation code into a serial bit; a tone period control signal generator having a tone period memory and a timer, for outputting a tone period control signal of the controller when the automatic tone period mode of the controller is not activated, and outputting a tone period control signal of the timer according to a counter value output from the tone period memory by the address control signal when the automatic tone period mode is activated; and a switch for switching and outputting a signal output from the serial converter according to the tone period control signal.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

Hereinbelow, a preferred embodiment of the present invention will be described in detail with reference to accompanying drawings. Throughout the drawings, like numerals are used for designating like elements.

Figure 1:
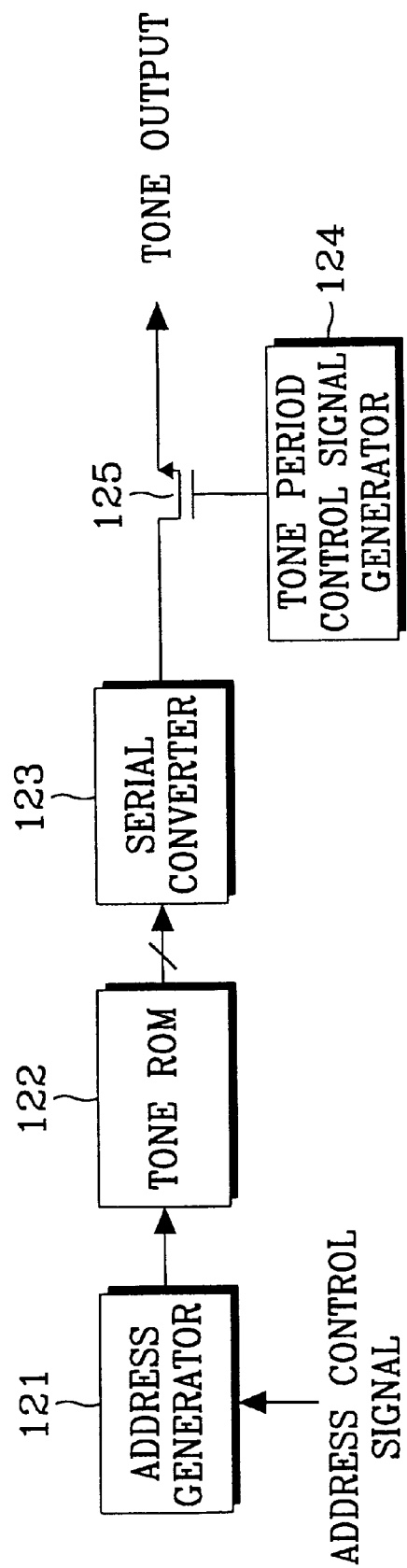
FIG. 1 is a system block diagram of a conventional tone generator.
Figure 2:
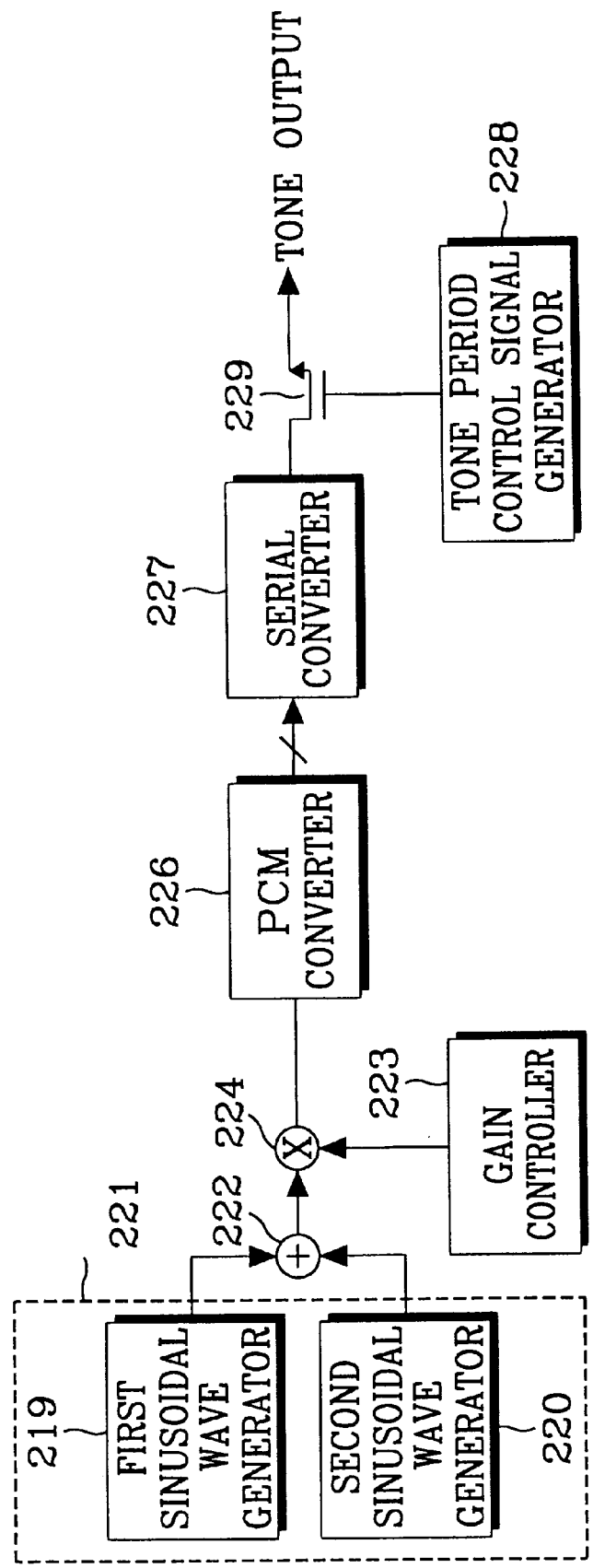
FIG. 2 is a system block diagram of a tone generator according to the present invention.

Referring to FIG. 2, the tone generator according to the present invention includes a sinusoidal wave generator 221 having a first sinusoidal wave generator 219 and a second sinusoidal wave generator 220 for generating sinusoidal waves of dual frequency components, an adder 222 for synthesizing the dual frequency components, a gain controller 223 for outputting a gain value, a multiplier 224 for multiplying the sampling data value of the sinusoidal wave output from the adder 222 with the gain value to output tone sampling data finally output as upper 14 bits, a PCM converter 226 for converting 14-bit data output from the multiplier 224 into 8-bit PCM data by the compression-to-extension conversion mode signal generator 225, a serial converter 227 for converting and outputting the output of the PCM converter 226 serially, a tone period control signal generator 228 for generating a tone period control signal, and a FET 229 for receiving the tone period control signal as a switching control signal, receiving and outputting the output of the serial converter 227.

Figure 3:
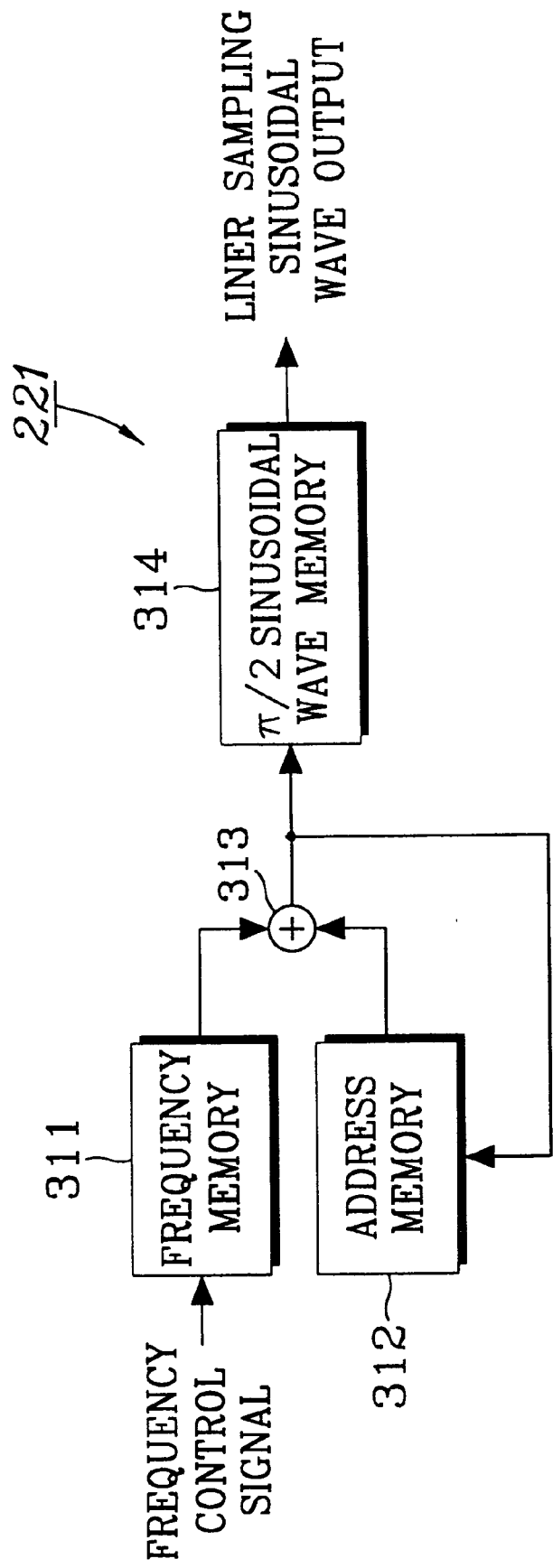
FIG. 3 is a detailed system block diagram of a sinusoidal wave shown in FIG. 2.

FIG. 3 is a detailed circuit diagram of the sinusoidal wave generator 221 shown in FIG. 2.

Referring to FIGS. 2 and 3, a frequency memory 311 outputs a corresponding frequency component by a frequency control signal in a system controller (not shown). Also, an address memory 312 receives and outputs an address signal. An adder 313 adds an output signal of the frequency memory 311 to that of the address memory 312 and outputs an address signal. Then, a $\pi/2$ sinusoidal wave memory 314 tabulates sampling values of π/2 period and outputs corresponding linear sampling values by the address signal. In other words, the corresponding to the address signal outputs linear sampling sinusoidal wave while scanning the tabulated values corresponding to the address signal. For example, if a sampling sinusoidal wave of 2 Hz is intended to be output, the frequency memory 311 outputs an address signal of '2' and the address memory 312 outputs an address signal of '0'. Then, the adder 313 outputs an address signal of '2'. Accordingly, the π/2 sinusoidal wave memory 314 outputs a sampling value corresponding to the address '2'. Thereafter, if the address memory 312 outputs '2', the adder 313 outputs an address signal of '4'. By doing so, the linear sampling sinusoidal wave is output. Also, in order to generate the dual frequency, the linear sampling sinusoidal wave is divided temporally to output the divided waves to the adder 222 shown in FIG. 2.

Figure 4:
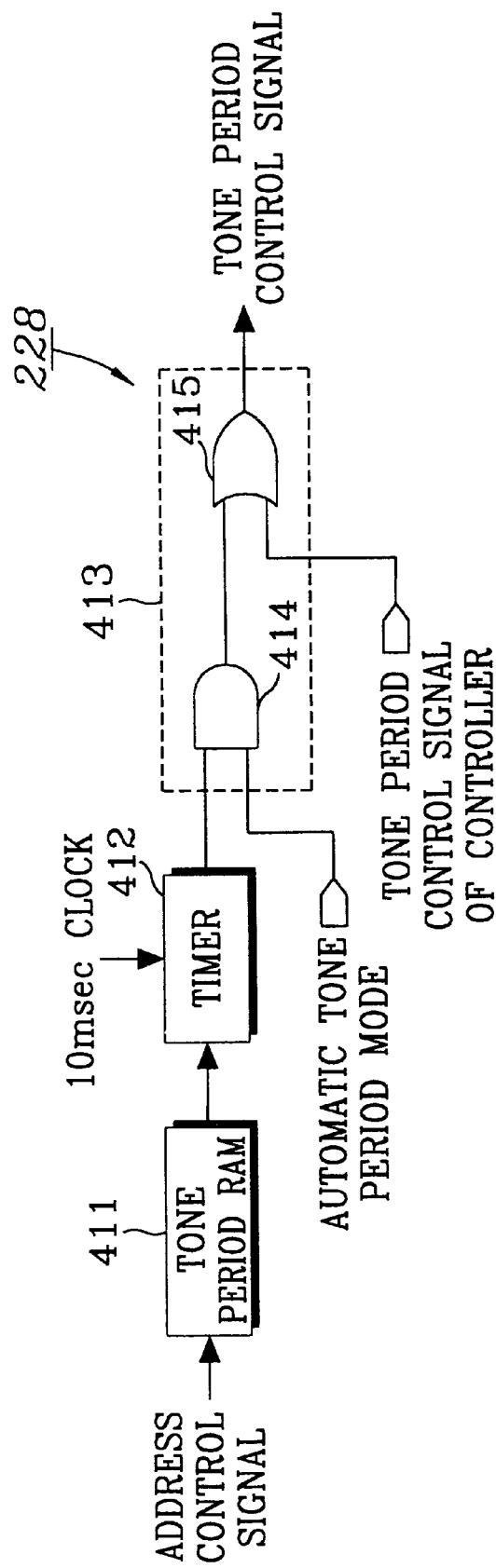
FIG. 4 is a detailed system block diagram of a tone period control signal generator shown in FIG. 2.

FIG. 4 is a detailed system block diagram of a tone period control signal generator shown in FIG. 2.

Referring to FIG. 4, a tone period random access memory (RAM) 411 stores tone period time and outputs the corresponding tone period time according to an address control signal generated in a system controller (not shown). A timer 412 allotted to a tone channel and whose driving clock thereof is 10 msec outputs a tone period control signal by counting the tone period time by the tone period RAM 411. A selector 413 selects and outputs a tone period control signal output from the timer 412 or a tone period control signal output from the controller according to an automatic tone period mode signal input from the system controller. When '0' is applied, which represents that the automatic tone period mode signal is inactivated by an AND gate 414 and an OR gate 415, the tone period control signal of the timer 412 is not output but that of the controller is output. When '1' is applied, that is, the automatic tone period mode signal is activated, the tone period control signal of the timer 412 is output as the automatic tone period control mode. At this time, the tone period control signal of the controller is necessarily '0'.

Figure 5:
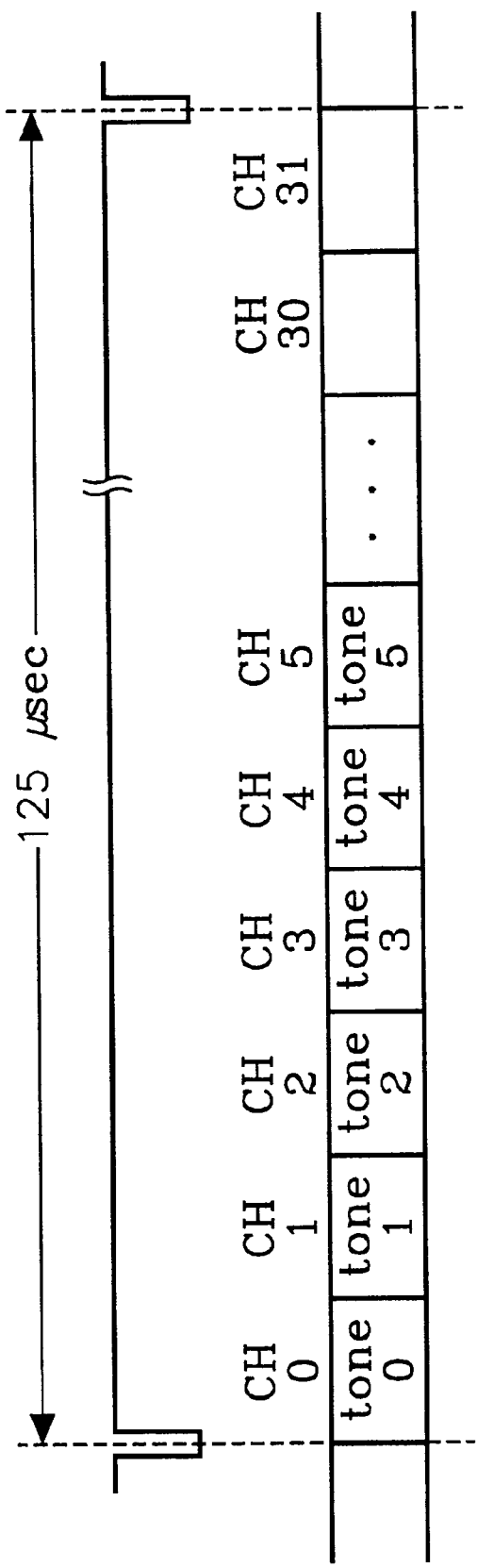
FIG. 5 is a timing chart for a tone signal output from the tone generator shown in FIG. 2.

FIG. 5 is a timing chart for a final tone output. Referring to FIG. 5, a channel is composed of 8-bit PCM, and a transmission speed of an output tone is 2.048 Mbps, which takes an E1 frame format.

As described above, if an operator only sets the frequency, gain, tone period, A/μ law values of his/her desired tone, the tone can be generated. Therefore, the desired tone size can be easily changed. Also, since an external tone ROM is not necessary, the fabrication of the tone ROM is not needed to be supervised. Further, since the tone period is automatically controlled by set values, a separate software is not required.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A tone generator comprising:

a controller for generating a frequency control signal, an address control signal, a tone period control signal and an automatic tone period mode;

a sinusoidal wave generator having a nonvolatile table of a sampled value of π/2 period, which outputs corresponding sampling frequency according to said frequency control signal, for synthesizing two single frequencies generated by dividing temporally said sampling frequency output from said nonvolatile table and outputting a dual sinusoidal wave;

a gain signal generator for generating a gain signal; a multiplier for multiplying said sinusoidal wave and the gain signal to output tone sampling data;

a pulse code modulator for pulse-code-modulating said tone sampling data to output a pulse code modulation code; a serial converter for converting said pulse code modulation code into a serial bit;

a tone period control signal generator having a tone period memory and a timer, for outputting a tone period control signal of said controller when the automatic tone period mode of said controller is not activated, and outputting a tone period control signal of said timer according to a counter value output from said tone period memory by said address control signal when said automatic tone period mode is activated; and a switch for switching and outputting a signal output from said serial converter according to said tone period control signal.

2. A tone generator as claimed in claim 1, wherein said sinusoidal wave generating means comprises:

a frequency memory for outputting a corresponding frequency component by a frequency control signal;

an address memory for receiving and outputting an address signal;

an adder for adding an output signal of said frequency memory to that of said address memory and outputting an address signal;

a nonvolatile table memory of said sampling value of π/2 period, for receiving said address signal of said adding means and outputting said sampling frequency of the corresponding address;

means for generating said dual frequency by temporally dividing the sampling frequency of said nonvolatile table memory; and an adding means for synthesizing and outputting said dual frequency.

3. A tone generator as claimed in claim 1, wherein said tone period control signal generating means comprises:

a tone memory having said counter value for outputting said counter value corresponding said address control signal;

a timer for receiving driving clocks and outputting said tone period control signal according to said counter value; and a selector for selectively outputting a tone period control signal of said timer and a tone period control signal of said controller according to said automatic tone period mode signal.

* * * * *